United States Patent

Bloomfield et al.

[15] 3,698,735
[45] Oct. 17, 1972

[54] UTILITY WHEEL-BEARING CARTS

[72] Inventors: Harold Bloomfield; Melvin F. Roberts, both of Chicago, Ill.

[73] Assignee: Bloomfield Industries, Inc., Chicago, Ill.

[22] Filed: March 8, 1971

[21] Appl. No.: 121,986

[52] U.S. Cl. ............................280/47.35, 280/79.3
[51] Int. Cl. ..............................................B62b 3/00
[58] Field of Search ..280/33.99 R, 33.99 H, 33.99 S, 280/35, 36 R, 36 C, 47, 47.19, 47.34, 47.35, 79.1, 79.3; 224/42.46; 211/49, 74, 130, 149, 134, 182; 108/152; 287/56, 54.1 A, 54.1 B, 54.1 D, 54.1 E

[56] References Cited

UNITED STATES PATENTS

| | | | |
|---|---|---|---|
| 642,357 | 1/1900 | Ofverstrom | 287/54 E |
| 3,071,399 | 1/1963 | Cronin | 287/54 B |
| 2,846,249 | 8/1958 | Johnson | 287/56 |
| 2,673,671 | 3/1954 | Williams | 224/42.46 |
| 1,742,344 | 1/1930 | Davis | 211/182 X |
| 2,950,015 | 8/1960 | Pataky | 211/182 |
| 2,982,422 | 5/1961 | Asproyerakas | 280/79.3 X |
| 1,987,385 | 1/1935 | Back | 280/47.35 X |
| 1,051,452 | 1/1913 | Rock | 280/79.3 X |
| 2,572,780 | 10/1951 | Tackenberg | 211/134 X |
| 2,764,419 | 9/1956 | Enders | 280/47.35 X |
| 3,007,708 | 11/1961 | Ochs | 280/79.3 X |
| 3,272,528 | 9/1966 | Young et al. | 280/79.3 X |
| 2,560,059 | 7/1951 | Young | 280/47.35 |

FOREIGN PATENTS OR APPLICATIONS

| | | | |
|---|---|---|---|
| 6,408,376 | 1/1965 | Netherlands | 211/182 |
| 1,084,855 | 7/1954 | France | 280/47.35 |

*Primary Examiner*—Kenneth H. Betts
*Assistant Examiner*—Robert R. Song
*Attorney*—Edward C. Threedy

[57] ABSTRACT

A utility wheel-bearing cart which is adapted for a wide range of uses including use in homes, restaurants, hospitals, motels, hotels, grocery stores, and the like, for transportation of various articles and merchandise, the cart comprising a plurality of horizontally disposed shelves supported in superimposed spaced relation with respect to each other, each shelf being supported at one end from a support and from which the shelf extends laterally in a horizontal plane from at least one side of the support.

3 Claims, 12 Drawing Figures

PATENTED OCT 17 1972 3,698,735
SHEET 1 OF 2
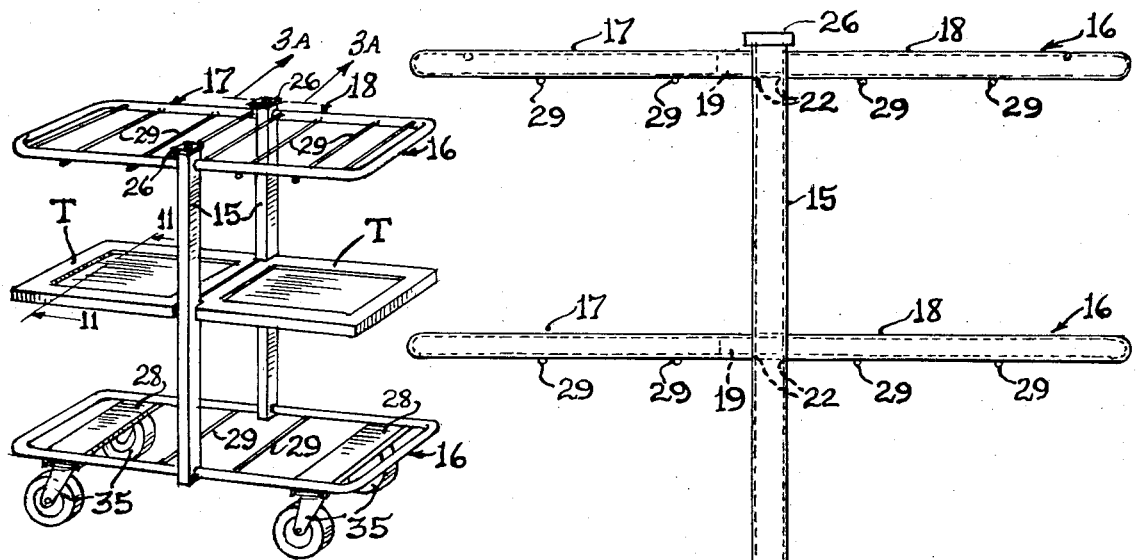
Fig.1.
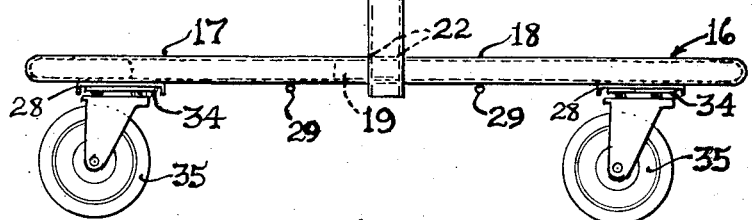
Fig.2.
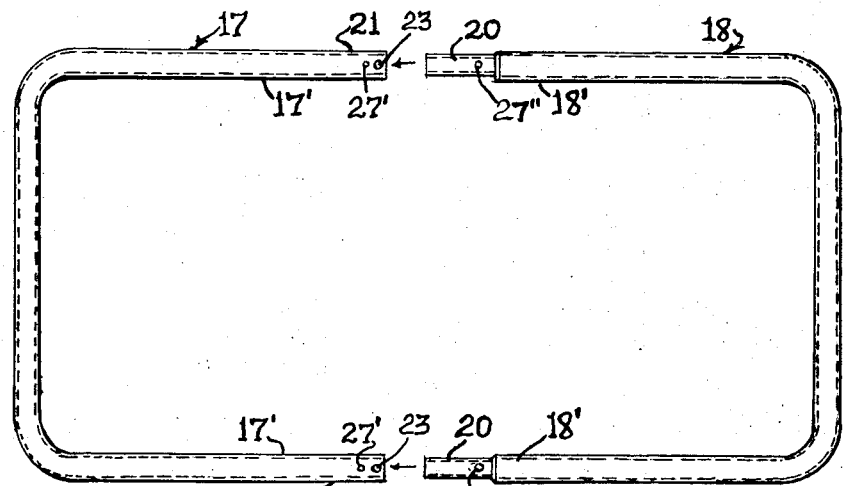
Fig.3.
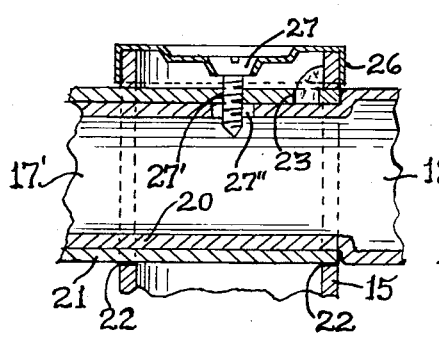
Fig.3.A.
INVENTORS.
HAROLD BLOOMFIELD &
MELVIN F. ROBERTS
BY Edward C. Threedy
THEIR ATTORNEY.

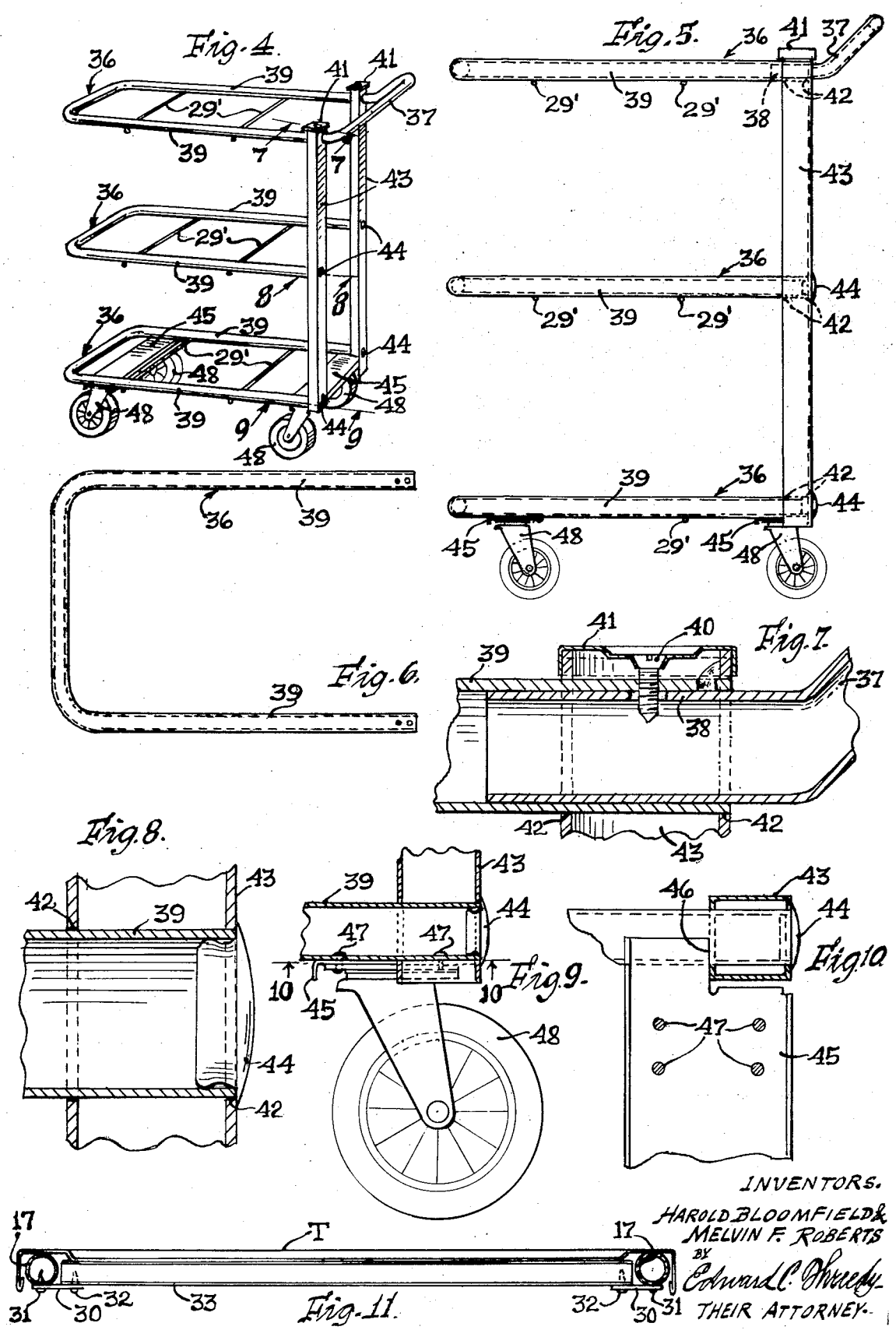

UTILITY WHEEL-BEARING CARTS

SUMMARY OF THE INVENTION

While our improved utility cart has many novel and useful features, the description to follow will evidence that the cart is structurally strong, while comprising a minimum number of parts which can be welded together with the weld spots concealed by caps, thus presenting a smooth, attractive and easily cleaned surface.

A special feature of our improved utility cart is that the same is of such a structure and size as will permit the cart to be wheeled over to a table top with the middle and bottom shelves of the cart being clear, so that they will enter under the table top, thus facilitating fast removal of articles or merchandise from the table top to the cart or vice versa.

The invention consists of the novel combination and assembly of parts shown in the accompanying drawings, in which:

FIG. 1 is a perspective view of one form of our improved cart;

FIG. 2 is a side elevational view of the same, but without the trays mounted on the intermediate shelf units;

FIG. 3 is a plan view of the tubular elements from which the shelf units of the cart shown in FIG. 1 are formed;

FIG. 3A is a sectional view taken on the line 3A—3A of FIG. 1;

FIG. 4 is a perspective view of another form of cart embodying our invention;

FIG. 5 is a side elevational view of the same;

FIG. 6 is a plan view of one of the tubular members forming each shelf;

FIG. 7 is a fragmentary sectional detail view taken substantially on line 7—7 of FIG. 4;

FIG. 8 is a fragmentary sectional detail view taken substantially on line 8—8 of FIG. 4;

FIG. 9 is a fragmentary sectional detail view taken substantially on line 9—9 of FIG. 4;

FIG. 10 is a fragmentary sectional detail view taken substantially on line 10—10 of FIG. 9; and FIG. 11 is a sectional detail view taken substantially on line 11—11 of FIG. 1.

Referring more particularly to FIGS. 1 to 3 of the drawings, our improved cart comprises a pair of hollow supporting posts 15 arranged in vertical parallel spaced relation with respect to each other and each formed substantially square in cross section. From the opposite corresponding sides of these supporting posts 15 extend the shelf units 16. These shelf units 16 are arranged in parallel spaced relation with respect to each other and in a substantially horizontal plane. Each shelf unit 16 has a frame formed of elongated tubular members 17 and 18 disposed in substantially the same plane and formed substantially U-shaped in plan view. The end portions of the arms 17' of the members 17 are telescopically arranged with respect to the arms 18' of the tubular members 18, as at 19 (FIGS. 2 and 3).

This is accomplished by reducing the ends 20 of the tubular members 18 to a diameter which will permit the reduced end portions 20 to be fitted into the end portions 21 of the arms 17' of the tubular members 17 on the opposite side of the posts 15. The end portions 21 project through openings 22 formed in the posts 15, thus to complete the connection between the shelf units and the posts 15. Formed in the end portions 21 are openings 27' which register with openings 27' formed in the reduced portions 20 of the tubular members 18. Also formed in the end portions 21 are weld holes 23. The telescoping tubular members 17 and 18 are connected together by welding into the weld holes 23 (FIG. 3A).

The open top end portions of the posts 15 are each closed by a cap 26 which is attached to the opposite tubular member by means of a screw 27 (FIG. 3A) threaded through openings 27' and projecting through opening 27''.

The shelf members 17 and 18 include transversely extending plates 28 adjacent their U-shaped end portions and reinforcing or supporting bars 29 inwardly of the plates to provide substantial support for trays, pans, or the like (FIG. 1).

One or more of the shelf units 16 may have attached thereto a tray upon which the articles to be transported may be mounted. In FIG. 1, we have shown the intermediate shelf units provided with such a tray--however, it is to be understood that all of the shelves may be so provided. In FIG. 11 we have shown a sectional detail view of the tray-type shelf unit. As there shown, there are attached to the arms of the U-shaped tubular members 17 and 18 laterally inwardly extending lugs 30, the attachment being accomplished by screws 31. To these lugs 30 by means of screws 32 is attached a channel-shaped bar 33 which extends between the arms of the U-shaped members 17 and 18. This tray may be of any suitable material such a plastic, stainless steel, or the like, which is capable of resisting stains, rust, and undue wear. As shown in FIG. 11, the edges of the tray T are turned down to embrace the shelf unit 16. The tray T is preferably welded to the bar 33 in a manner well-known in the art.

As shown in FIGS. 1 and 2, there are attached in any suitable manner, as at 34, casters 35 which permit the cart to be moved about with ease and convenience.

In the form of the invention shown in FIGS. 4 and 5, the shelf units there indicated at 36 are of the same construction and design as the shelf members 17, but extend only from one side of the supporting posts indicated at 43 (of the same construction as the supporting post 15), thus to provide a single cantilever type cart, as distinguished from the construction shown in FIGS. 1 and 2 providing a double cantilever type cart.

In this form of construction there is provided a suitable handle 37 which is fitted to the uppermost shelf unit by inserting the reduced portion 38 thereof into the ends of the arms 39 of the uppermost shelf unit 36 and secured therein by a screw 40 threaded into a cap 41 and into the arms 39, as shown in FIG. 7.

The arms 39 of the shelf unit 36 have their end portions projected into openings 42 formed in the supporting posts 43, which, like the posts 15, is preferably substantially square in cross section and tubular in form. The ends of the arm 39 of the intermediate and lower shelf units 36 which project through the openings 42, are closed by a suitable cap 44, after the shelf units are welded to the posts 43, thus to conceal the weld (FIG. 8).

Extending transversely of the arms of the lowermost shelf unit 36 as shown in FIG. 4, are reinforcing or supporting bars 29' and relatively flat plates 45 which are attached to the adjacent arms 36 by spot welding or the like. The adjacent ends of the plates 45 as seen in FIG. 10, are notched as at 46 to receive the square tubular posts 43 which may be welded to the adjacent arms 39. Connected as at 47 to these plates 45, as seen in FIGS. 4, 5, 9 and 10, are casters 48 of any approved construction.

The form of construction as shown in FIG. 4 provides a very easily maneuverable cart which may be manufactured at an economical cost.

If desired, the shelves in this form of construction may be similar to those shown at T in FIGS. 1 and 2, i.e., one or more of the shelves may be in the form of a tray, as distinguished from an open shelf, for receiving any desired receptacle for transporting dishes, articles of merchandise, and the like.

Suitable bumper elements of any approved construction may be associated with the leading end of the lowermost shelf units to permit the cart to be moved about without marring or otherwise damaging adjacent surfaces it may contact.

In both forms of construction it is intended that the height of the upper shelf unit be such as to be positioned over a table top with the lower shelves disposed beneath the table top, in which position loading of the cart may be greatly facilitated and easily accomplished.

The construction shown and described herein is relatively simple and of such nature as to facilitate easy, convenient and economical assembly, thereby reducing labor and the requirement of skilled assemblers.

While we have illustrated and described the preferred form of construction for carrying our invention into effect, this is capable of variation and modification without departing from the spirit of the invention. We therefore do not wish to be limited to the precise details of construction set forth, but desire to avail ourselves of such variations and modifications as come within the scope of the appended claims.

Having thus described our invention, what we claim as new and desire to protect by Letters Patent is:

1. A utility cart comprising
   a. a horizontally disposed wheeled base member,
   b. a pair of laterally spaced apart, vertically oriented and parallel tubular frame posts upstanding from said base member and supported thereby,
   c. each of said posts having opposing vertical walls,
   d. said walls being provided at at least one point along the vertical extent thereof with horizontally aligned openings,
   e. said aligned openings in one post being in the same horizontal plane with the aligned openings in the other post,
   f. at least one horizontally disposed shelf unit having a substantially U-shaped tubular frame constituted with parallelly extending arms having free end portions,
   g. said free end portions of the frame for the shelf unit being socketed in said aligned openings in the walls of the posts so that the end portions project completely through the aligned openings in said posts and receive the resulting strength from two spaced apart points of contact which are defined by the wall surfaces defining the aligned openings,
   h. a tubular handle member of substantially U-shaped configuration and having substantially parallel arms provided with free end portions,
   i. said free end portions of the arms for the handle member being of a lesser diameter than the end portions of the arms of the shelf unit and being socketed within and supported by said end portions of the arms for the shelf unit, and,
   j. single means for interlocking said socketed end portions of the shelf unit and the handle together and connecting said end portions to the frame posts.

2. The invention of claim 1 wherein said shelf unit and the handle are disposed adjacent the upper ends of the posts, said upper ends being open and caps closing off said upper ends, and said last means includes screw members extending longitudinally of the posts through the upper ends thereof and fixedly passing transversely through the socketed ends of the shelf unit arms and the handle arms, and said screw members being carried by the caps.

3. The invention of claim 2 wherein a plurality of horizontally disposed shelf units are provided and are disposed in overlying projection from the posts and in vertically spaced apart parallel relation to each other and to the said shelf unit adjacent the upper ends of the posts, said posts having a plurality of sets of aligned openings and said shelf units having parallel arms with free end portions fixedly socketed in and extending through said openings and means for securing said end portions within the openings in the posts so that the walls of the posts supportively engage the end portions.

* * * * *